United States Patent [19]

Finlay

[11] Patent Number: 5,177,944
[45] Date of Patent: Jan. 12, 1993

[54] HARVESTING CROP FROM PARALLEL WINDROWS

[76] Inventor: Douglas K. Finlay, Box 176, Rapid City, Manitoba, Canada, R0K 1W0

[21] Appl. No.: 788,605
[22] Filed: Nov. 6, 1991
[51] Int. Cl.⁵ .............................................. A01D 81/00
[52] U.S. Cl. ....................................... 56/365; 56/370
[58] Field of Search ............................. 56/365–369, 56/344, 345, 370, DIG. 21

[56] References Cited

U.S. PATENT DOCUMENTS 3,948,028  4/1976  Reber ................................... 56/365
3,975,892  8/1976  Hellkuhl ............................ 56/370 X Primary Examiner—Thuy M. Bui
Attorney, Agent, or Firm—Adrian D. Battison; Stanley G. Ade; Murray E. Thrift

[57] ABSTRACT

A crop harvesting machine comprises a main frame attached to a hitch of the type which pivots about a centre point of the main frame. On the main frame is attached a draper frame which pivots relative to the main frame and includes arms extending downwardly and forwardly from the main frame for supporting a draper section which comprises a single draper extending across the full width of the machine with rollers at the ends of the draper positioned directly at the ends of the machine. In front of the single draper is positioned a pickup section pivotally mounted relative to the draper frame and controlled in height by gauge wheels. The width of the machine is sufficient to pickup two windrows simultaneously at fourteen foot spacings, to deposit the crop from the windrows simultaneously onto the draper and to move the crop to one end of the draper for deposit onto the ground. This action provides a single windrow for subsequent collection by a baler in which the material which is previously been lying directly on the ground is now stacked upwardly from the ground for drying.

12 Claims, 3 Drawing Sheets

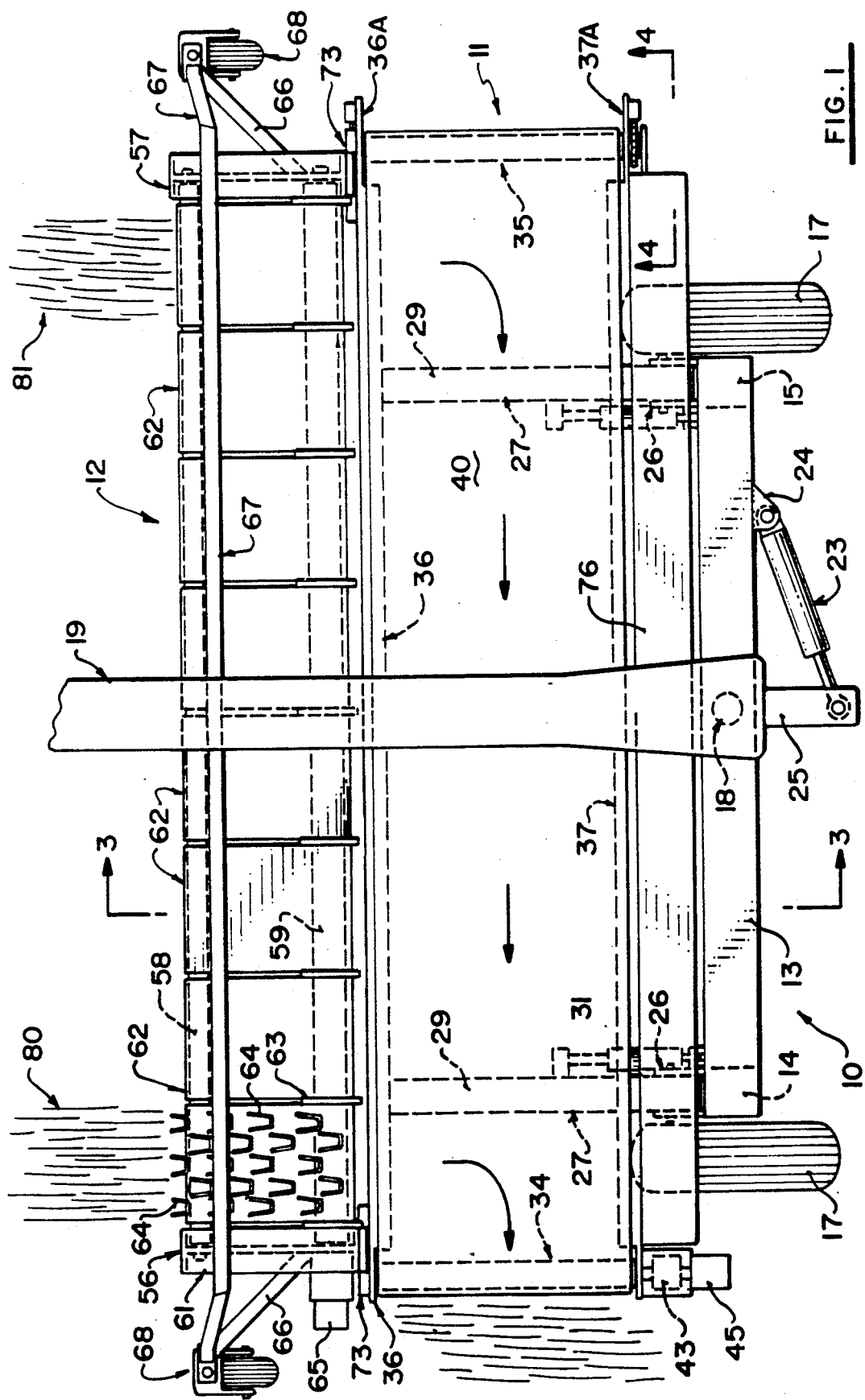

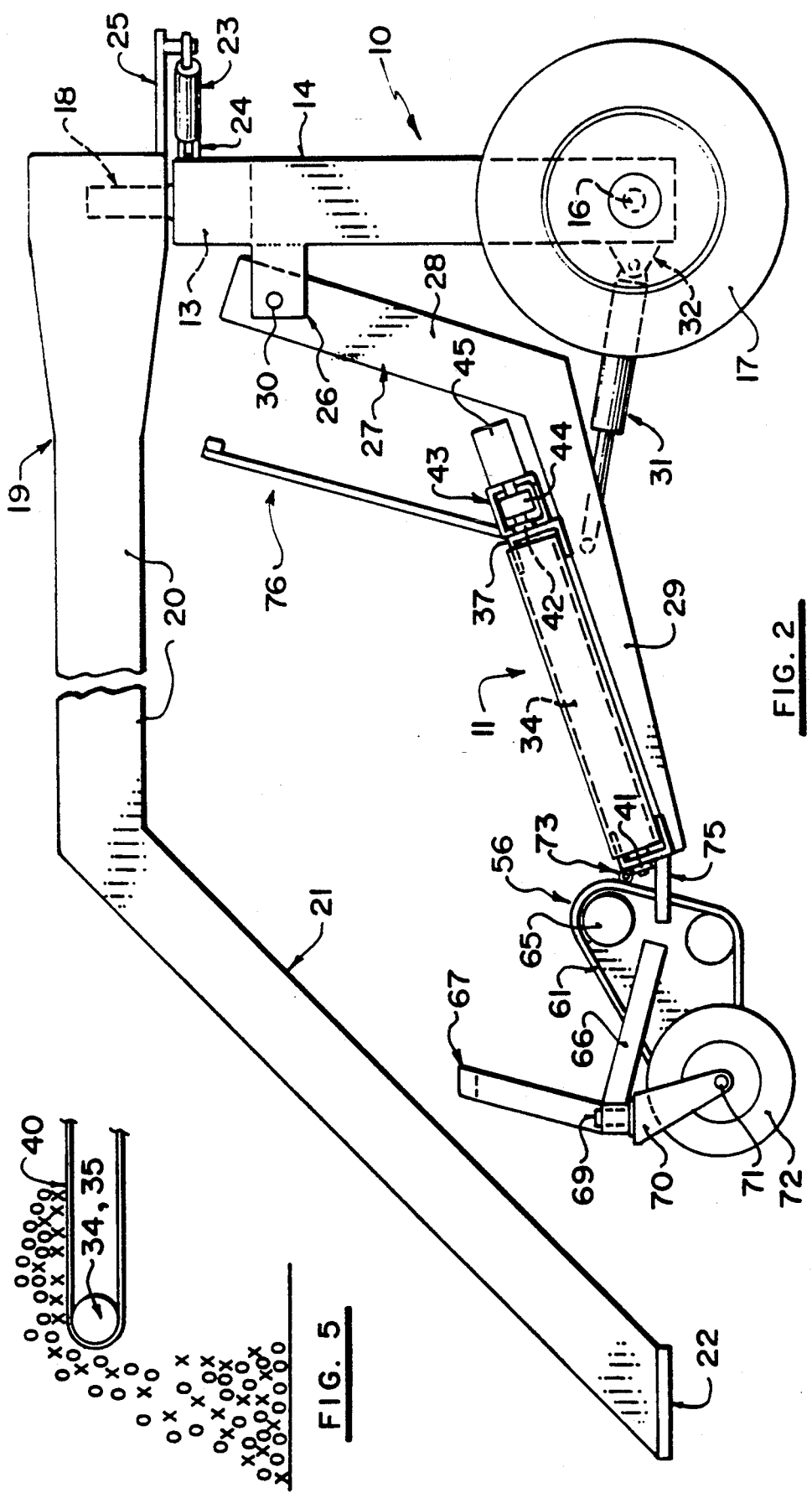

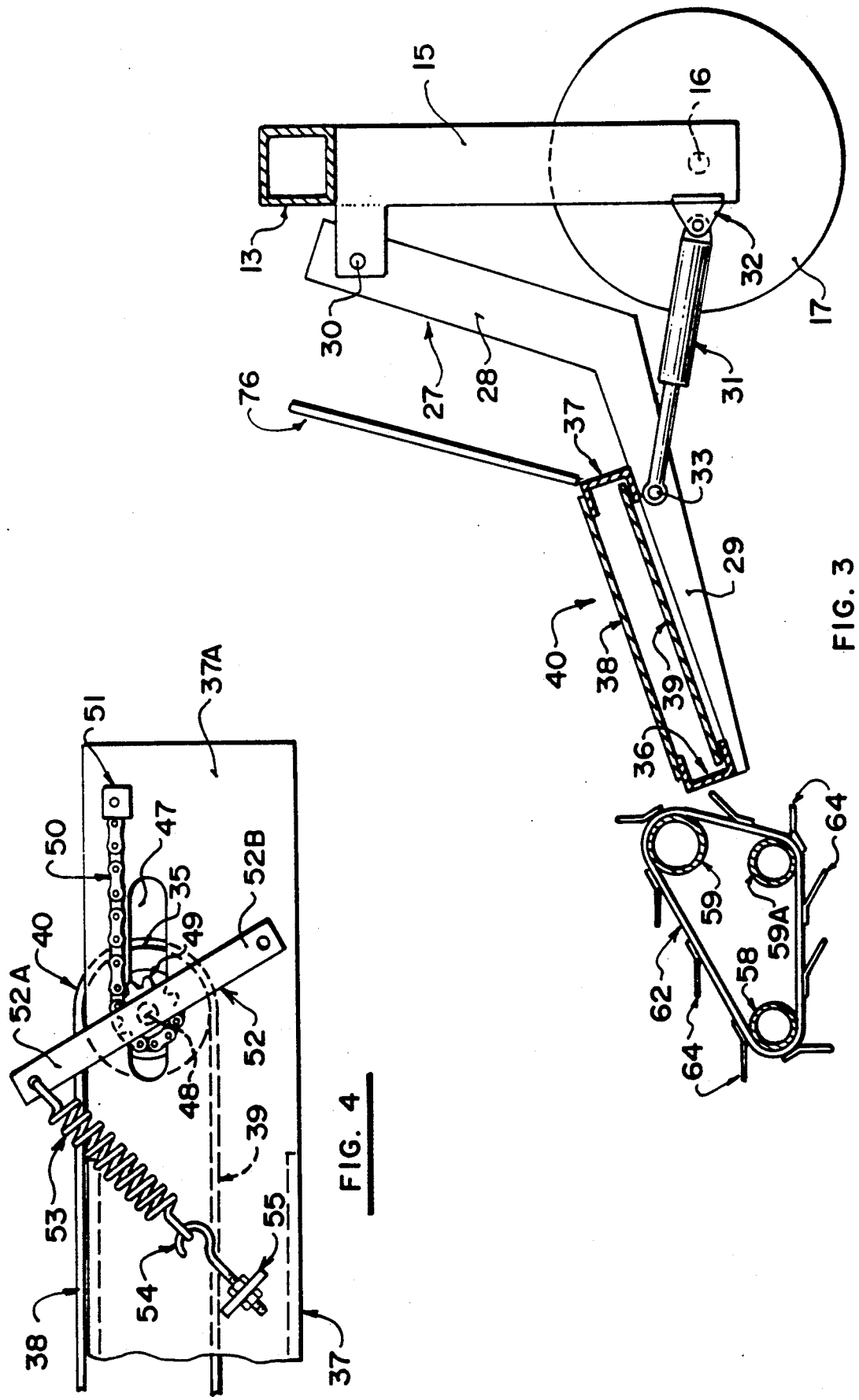

HARVESTING CROP FROM PARALLEL WINDROWS

BACKGROUND OF THE INVENTION

This invention relates to a machine and to a method for harvesting crop in parallel windrows.

Hay crop and other forage crop is generally cut into swaths or windrows using a swather which has a width of fourteen feet so that the crop is deposited in the windrow in parallel windrows of fourteen foot spacing.

The crop is then left to dry but in many conditions the underside of the windrow remains in a condition where it is not fully dried so it is often desirable to turn the windrow so that the underside is lifted up onto the top of a fresh windrow to allow complete drying.

Many designs of swath turners have been proposed and many machines are currently available on the market place. Generally these machines include a pickup of width of the order of five feet which lifts the crop from the windrow and then a turning system is provided which carries the crop rearwardly and then rolls it over so that it is inverted and then dropped back onto the ground in the inverted condition. Generally these machines include a mould board system or other inverting system which is relatively complicated and is harsh on the crop with a danger of damaging the crop and breaking leaves in many conditions of the crop.

Hay rakes are available which can act simultaneously on two windrows to take the windrows together into a single or common windrow and at the same time mixing the crop so that the portions that were on the underside are now mixed into the interior of the windrow to allow an improved drying action. However the rake systems are extremely harsh on the crop and generally break off much of the leaf material which constitutes the important nutrient supply in the forage material.

SUMMARY OF THE INVENTION

It is one object of the present invention, therefore to provide an improved harvesting machine for use with parallel windrows of this type which provides an improved harvesting in action allowing the windrow to dry effectively and improving the baling action after the windrow is fully dried.

According to the first aspect of the invention, therefore, there is provided a crop harvesting machine comprising a main frame, ground wheels on the frame for transportation of the frame across the ground in a working direction, a draper mounted on the frame including a pair of draper rollers each rotatable about a respective roller axis, means for driving the rotating one of the rollers about its respective axis and a draper canvas wrapped around the roller so as to define an upper run and a return run, the rollers being mounted on the frame with the axis of each lying parallel to the working direction and with one of the rollers being arranged at one end of the machine and the other of the rollers being arranged at an opposed end of the machine such that the upper run extends along the full length of the machine to transport crop deposited thereon to one of said ends, and a pickup assembly having a front roller and a rear roller parallel to the front roller with each roller lying along the machine substantially from said one end to said opposed end and belt means wrapped around the rollers for transporting the crop rearwardly, the rollers being located in front of the draper so as to lift crop from a windrow on the ground for deposit onto the draper for transport by the draper to said one of said ends for discharge, said machine having from said one end to said opposed end a length of at least fourteen feet so that the pickup assembly can lift simultaneously two side by side windrows for transport simultantaneously on said draper to said one of said ends for discharge.

According to a second aspect of the invention there is provided a method of harvesting crop comprising forming parallel equally spaced windrows of the crop, simultaneously picking up crop in two of the parallel windrows, depositing the picked up crop onto a single draper canvas, moving the draper canvas in a direction at right angles to the windrows and depositing the crop from the windrows simultaneously and directly from an end of the draper canvas onto the ground to form a common windrow of the crop.

One or more embodiments of the invention will now be described in conjunction with the accompanying drawings.

BRIEF DESCRIPTION OF THE DRAWINGS

FIG. 1 is a top plan view of a harvesting machine according to the present invention.

FIG. 2 is an end elevational view of the machine of FIG. 1.

FIG. 3 is a cross-sectional view along the lines 3—3 of FIG. 1.

FIG. 4 is a view along the lines 4—4 of FIG. 1.

FIG. 5 is a schematic rear elevational view of one end of the machine showing the deposit of the crop from the draper section onto the ground.

In the drawings like characters of reference indicate corresponding parts in the different figures.

-DETAILED DESCRIPTION

The harvesting machine shown in the drawings comprises a frame generally indicated at 10 on which is mounted a draper section generally indicated at 11 and a pickup section generally indicated at 12.

The main frame 10 comprises generally a transverse beam 13 and a pair of depending legs 14 and 15 each at a respective end of the main beam 13. Each of the legs 14 and 15 includes an axle member projecting outwardly in a horizontal direction in a direction opposed to the main beam and at the bottom of the leg one of which is indicated at 16 for mounting a conventional ground wheel 17. At a central location at the top of the main beam is mounted a vertical pivot pin 18 to which is attached a hitch arm 19 which projects in a horizontal direction from the main beam generally forwardly of the main beam. The hitch thus includes a horizontal section 20 and a downwardly and forwardly inclined section 21 extending to a hitch bracket 22 at the forward most end. The hitch bracket is adapted for attachment to a conventional tractor and includes the necessary linkages therefor. In addition the hitch member will include hydraulic coupling arrangemens which have been omitted for convenience of illustration but will be well apparent to one skilled in the art. The position of the hitch member in a pivotal action around the vertical pivot pin 18 can be adjusted by a hydraulic cylinder 23 coupled between a bracket 24 on a rear face of the main beam and a strut 25 connected rigidly to a rear edge of the hitch beam 19 so as to project outwardly from the pivot pin 18 in a direction opposed to the hitch beam. In this way the angle of the hitch beam 19 to the main beam 13 can be adjusted around the vertical pin 18 from a central position as shown in FIG. 1 to a position of the order of 45° in either direction about the central position. In the inclined positions of the hitch beam therefore the frame is transported in echelon relative to the tractor for operating upon ground to one side of the tractor in the conventional manner. In the position shown in FIG. 1, the frame is transported directly rearwardly of the tractor for a simple transport location upon the frame in a non-working position.

Each of the legs 14 and 15 includes a pair of flanges 26 projecting forwardly therefrom and straddling a generally L-shaped frame arm 27. Each of the frame arms includes a generally vertically depending portion 28 and a forwardly and downwardly inclined portion 29, the latter supporting the draper section 11. The frame arm 27 is mounted on the flanges 26 by a pivot pin 30 which allows the angle of the arm 29 to be raised and lowered while the main frame 11 remains substantially in a vertical orientation as controlled by the hitch beam. The angle of the frame arm 29 is adjusted by a hydraulic cylinder 31 operating between a lug 32 on a forward face of the depending leg 14, 15 and a pin 33 on the inside face of the arm 29.

The draper section 11 includes a first end draper roller 34 and a second end draper roller 35. The roller 34 is arranged directly at one end of the machine that is at a position spaced outwardly from the respective frame arm 27. The roller 35 is arranged at the opposed end of the machine similarly spaced outwardly from the respective frame arm 27. Each of the rollers is supported upon a front beam 36 and a rear beam 37 each of which extends along the full length of the machine and is rigidly attached to the pair of support arms 27 so as to extend thereacross at right angles. Each of the beams 36 and 37 is formed as a channel member along a majority of its length so as to have sufficient strength stiffened by the inturned flanges of the channel member and so that the inturned flanges provide support for the upper run 38 and lower run 39 respectively of a draper canvas generally indicated at 40. The draper canvas is wrapped around the rollers so as to extend along the full length of the machine defining an upper run which faces upwardly to receive crop dropped upon the upper run for transporting the crop longitudinally of the machine to one end or other end of the machine depending upon the direction of movement of the draper for deposit of the crop over the end roller from which the crop can fold directly vertically to the ground.

At the end adjacent the roller 34, each of the beams 36 and 37 has the inwardly projecting flanges of the channel shape thereof terminated leaving simply a flat web projecting outwardly for supporting the roller 34. The roller is thus mounted on bearings 41 at the forward end carried on the web of the beam 36 and bearings 42 at the rear end similarly carried on the web of the beam 37. On the outside of the beam 37 is mounted a box shaped housing 43 which carries a coupling 44 housed therein acting as a release clutch and communicating drive from a hydraulic motor 45 mounted upon a rear face of the box 43 for driving the roller 44. The hydraulic connections from the hitch to the hydraulic motor 45 are omitted for convenience of illustration but it will be appreciated that the hydraulic power for the hydraulic motor 45 and for the cylinders previously described is provided by the tractor unit in a conventional manner.

At the end adjacent the roller 35, each of the beams 36 and 37 similarly is shaped into a simple flat web 37A and 36A for mounting the roller 35. As best shown in FIG. 4, each of the webs 36A and 37A has an opening 47 formed therein in the form of a slot extending longitudinally of the beam. The roller 35 comprises a shaft 48 on which the roller 45 is mounted for rotation. The shaft 48 projects through the slot shaped openings 47 and carries on its end a sprocket 49 which is rigidly attached to the shaft 48 for rotation therewith. The sprocket receives the end of a chain 50 which extends longitudinally of the web 37A and is fastened thereto by a clamp 51. On the end of the shaft 48 is mounted a lever 52 which is pulled or biased by a spring 53 in a counterclockwise direction, the spring being adjustable by a mounting hook and bracket 55. The operation of a spring is therefore to rotate the shaft and the sprocket in a counterclockwise direction to wind the chain 50 onto the sprocket thus acting to pull the shaft 48 in a direction toward the right hand end of the web 37A. The opposed end of the roller 35 which is not shown in FIG. 4 at the front beam 36 includes an identical chain and sprocket arrangement so that the action to rotate the shaft pulls both ends of the rollers towards the end of the beam. The roller is thus tensioned toward the end of the beam thus tensioning the draper but allowing shrinkage of the draper to occur by stretching the string 53 should this occur as the draper changes length in storage. The amount of tension can be adjusted by adjusting the length of the spring 53 and by selecting one or other of the two arms 52A and 52B of the lever 52 since the spring can be attached to either of those arms depending upon the angular orientation of the lever.

The pickup section 12 comprises a pair of end brackets 56 and 57 each providing bearing support for three elongate rollers 58, 59 and 59A which extend along the full length of the machine from one bracket to the opposed bracket. The rollers are supported for rotation about the longitudinal axis of each roller so that the roller 58 is positioned forwardly of the rollers 59 and 59A. The rollers are arranged at the apexes of a triangle with the line joining the tangents to the rollers 58 and 59A lying substantially horizontal and just above the ground. A plurality of pickup belts 62 are wrapped around the rollers so as to be driven by the rollers to define an upper run and a lower return run wrapped around the rollers and bridging the space therebetween. The belts are held at the required slightly spaced location by a plurality of spacer discs 63 carried upon the rear roller 59. Each of the belts is of a conventional nature of the type used in pickups and includes a plurality of tynes 64 arranged in a spaced array across the belt with fingers of the tynes projecting downwardly and outwardly from the belt to act to lift crop from the ground onto the belts for transportation by the belts rearwardly toward the draper section. The three roller type pickup provides an improved lifting action at the lower horizontal run of the belts and particularly around the front roller 58, to avoid crop being left in the field.

The end brackets 56 and 57 each include an end plate 60 and a surrounding flange 61 providing stiffening for the end plate and shaped to follow substantially the periphery of the belt as shown in the end elevation of FIG. 2. Mounted on the end plate 60 of the bracket 56 is a hydraulic motor 65 arranged directly connected to the roller 59 for driving the roller in rotation about the axis of the roller. The hydraulic couplings from the hydraulic motor through the frame to the connection on the hitch are not shown for convenience of illustration.

Each of the brackets has welded to the respective end plate thereof a support strut 66 which extends forwardly and slightly upwardly from the end plate 60 for connection to a cross beam 67 interconnecting the two struts 66 at opposed ends of the machine. Each end of the cross beam 67 is attached to a castor guage wheel 68 of a conventional nature including a vertical support pin on which the wheel can castor indicated at 69 and a depending support bracket 70 connected to an axle 71 of the wheel 72. The guage wheels are thus rigidly attached to the pickup through the brackets 56 and 57 to support the forward end of the pickup at a required height relative to the ground and controlled by the guage wheels 68.

Each of the brackets 56 and 57 is connected to the front cross beam 36 by a hinge mechanism 73 including spaced tubes welded to the beam 36 and a central tube welded to the bracket with a pin passing coaxially through the tubes to allow the required pivotal action about the horizontal pin. The hinge coupling is relatively loose so as to allow a twisting action in which one end of the pickup can be lifted relative to the frame of the machine without lifting the other end, the twist thus caused being accomodated through the beam 67 and through the rollers 58 and 59.

As shown therefore best in FIG. 2, the angle of the draper section is controlled by the position of the draper frame relative to the main frame while the pickup is free to float on the forward end of the frame under control of the guage wheels. A stop 75 is located on the front beam 36 to limit the downward movement of the pickup as the draper frame is raised so that the draper frame and the pickup can be lifted from the ground for a transport position.

The draper frame further includes a backsheet generally indicated at 76 which is connected to the rear beam 37 and extends upwardly and rearwardly therefrom. The backsheet 76 is a substantially planar sheet which is stationary relative to the frame and provides a guide for the crop to prevent the crop from moving beyond the rear edge of the draper. There is thus defined an obtuse angle between the surface of the draper and the surface of the planar backsheet 76 which allows the crop to lie across the draper and be transported by the draper without danger of crop loss over the rear edge of the draper.

The width of the machine is chosen to be greater than fourteen feet and generally approximately of the order of sixteen feet which is just sufficient to accomodate two swaths formed on fourteen foot centres using a conventional fourteen foot swather. This dimension is the conventional dimension used in almost all hay and forage crop systems so that in almost all cases the swaths are formed at the fourteen foot centre dimension.

In operation the machine is attached to a suitable tractor unit and drawn across the field subsequent to the formation of the swath and an initial drying of the swath or windrow. Two windrows are thus shown at 80 and 81 lying in the field forwardly of the machine as it moved across the field. The windrows are then picked up by the pickup mechanism and move rearwardly onto the draper which is simultaneously driven by the motor 45 either to the left or the right as required and as selected by the control system to the motor 45. The crop is thus transported sideways from the pickup system under control of the drapers and the backsheet. As the crop is moved sideways, the crop from the second windrow is deposited on top of the crop from the first windrow and spread by the continual movement over the upper surface of the crop on the windrow so that the crop from the two windrows is laid together. The crop is then deposited from the end roller directly downwardly onto the ground. As the crop falls from the end roller as shown in FIG. 5, the crop from the two mixed windrows is stacked into a common windrow. Schematically the crop material which has been lying directly on the ground from the windrows picked up is indicated by the symbol "x" and the remaining crop is indicated by the symbol "o". It will be noted therefore that the crop previously lying on the ground is now stacked upwardly from the ground so that it is available for drying. While the device does not therefore turn the windrow fully over, the combination of the two windrows and the direct deposit from the end roller of the draper causes the crop to be stacked in the manner in which the previously wet crop is lifted away from the ground for drying.

The angles of the draper to the horizontal and the back sheet to the vertical can be adjusted to reduce crop bunching and loss preferably by raising the backsheet to a substantially vertical position and by lowering the draper closer to the horizontal from the angles as shown to a substantially horizontal position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A crop harvesting machine comprising a main frame, ground wheels on the frame for transportation of the frame across the ground in a working direction, a draper mounted on the frame including a pair of draper rollers each rotatable about a respective roller axis, means for driving the rotating one of the rollers about its respective axis and a draper canvas wrapped around the roller so as to define an upper run and a return run, the rollers being mounted on the frame with the axis of each lying parallel to the working direction and with one of the rollers being arranged at one end of the machine and the other of the rollers being arranged at an opposed end of the machine such that the upper run extends along the full length of the machine to transport crop deposited thereon to one of said ends, and a pickup assembly having a front roller and a rear roller parallel to the front roller with each roller lying along the machine substantially from said one end to said opposed end and belt means wrapped around the rollers for transporting the crop rearwardly, the rollers being located in front of the draper so as to lift crop from a windrow on the ground for deposit onto the draper for transport by the draper to said one of said ends for discharge, said machine having from said one end to said opposed end a length of at least fourteen feet so that the pickup assembly can lift simultaneously two side by side windrows for transport simultantaneously on said draper to said one of said ends for discharge.

2. The machine according to claim 1 wherein the frame includes a main frame section and a pair of L-shaped sub frame elements pivotally mounted on the main frame section for lifting action relative to the main frame section, said draper being mounted on forwardly extending base arms of the L-shaped frame members.

3. The machine according to claim 2 wherein the sub frame includes a pair of frame members each extending along the length of the draper and defining supports for the draper rollers and for the draper canvas.

4. The machine according to claim 2 including a hitch arm extending from the main frame, the hitch arm being connected to the main frame at a position midway along the length of the main frame and being mounted on the main frame for pivotal movement relative thereto about a substantially vertical axis, the hitch arm extending from the main frame to a hitch connection at an end of the hitch arm remote from the pivotal axis, and including means for adjustment of the angle of the hitch arm relative to the main frame about said vertical pivot axis.

5. The machine according to claim 1 wherein the pickup assembly includes end support members each arranged at a respective end of the front and rear rollers and providing a support mounting for each of the front and rear rollers, each of the support members being mounted on the frame for pivotal movement about an axis longitudinal of the frame and rearwardly of said rear roller to allow a lifting action of the pickup relative to the frame about said pivot axis.

6. The machine according to claim 5 including a pair of guage wheels each connected to a respective one of the support members and arranged for engaging the ground adjacent the support member for raising and lowering the pickup about said pivot axis in accordance with the ground surface.

7. The machine according to claim 1 including a fixed back sheet member positioned rearwardly of the draper and having a lower edge immediately adjacent a rear edge of the draper canvas and an upper edge positioned rearwardly and upwardly from the lower edge such that the planar back sheet is inclined rearwardly from said draper canvas.

8. The machine according to claim 1 including a first hydraulic motor mounted on the frame for directly driving one of said draper rollers and a second hydraulic motor mounted on the pickup assembly for directly driving one of said front and rear rollers.

9. The machine according to claim 1 including tensioning means for tensioning the draper canvas, the tensioning means comprising a first and a second sprocket means mounted at respective ends of that one of the draper rollers which is not driven, a first and a second chain length having one end attached to the frame and a second end attached to a respective one of the sprocket means, lever means for rotating the sprocket means simultaneously about an axis of the roller so as to pull the sprocket means along the respective chain length to pull the roller axis in a direction to tension the draper canvas and spring biasing means for pulling the lever in a direction to tension the draper canvas.

10. The machine according to claim 9 wherein the lever has a central point attached to one of said sprockets and a pair of arms extending outwardly therefrom to opposed sides thereof such that the spring biasing means can be coupled to a selected one of said arms for adjustment of the tension applied to the draper canvas.

11. A method of harvesting crop comprising forming parallel equally spaced windrows of the crop, simultaneously picking up crop in two of the parallel windrows, depositing the picked up crop onto a single draper canvas, moving the draper canvas in a direction at right angles to the windrows and depositing the crop from the windrows simultaneously and directly from an end of the draper canvas onto the ground to form a common windrow of the crop.

12. The method according to claim 11 wherein that section of the crop which, before being picked up in the windrow, lay directly on the ground is deposited onto the common windrow such that the material stands upwardly from the ground to allow drying of that material.

* * * * *